(12) United States Patent
Shigeeda

(10) Patent No.: US 12,176,165 B2
(45) Date of Patent: Dec. 24, 2024

(54) SLOW-RELEASE RELAY CIRCUIT AND TRAIN CONTROL DEVICE

(71) Applicant: Mitsubishi Electric Corporation, Tokyo (JP)

(72) Inventor: Tetsuya Shigeeda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 325 days.

(21) Appl. No.: 17/626,569

(22) PCT Filed: Jul. 24, 2019

(86) PCT No.: PCT/JP2019/029066
§ 371 (c)(1),
(2) Date: Jan. 12, 2022

(87) PCT Pub. No.: WO2021/014619
PCT Pub. Date: Jan. 28, 2021

(65) Prior Publication Data
US 2022/0246379 A1    Aug. 4, 2022

(51) Int. Cl.
*H01H 47/26* (2006.01)
*H01H 47/00* (2006.01)
*H01H 47/22* (2006.01)
*H01H 50/12* (2006.01)
*H02H 3/08* (2006.01)
*H02J 9/06* (2006.01)

(52) U.S. Cl.
CPC .......... *H01H 47/002* (2013.01); *H01H 47/22* (2013.01); *H02H 3/08* (2013.01); *H02J 9/061* (2013.01)

(58) Field of Classification Search
CPC .......... H01H 47/002; H02H 3/08; H02J 9/061
USPC .......................................................... 361/211
See application file for complete search history.

(56) References Cited

U.S. PATENT DOCUMENTS

| 5,220,685 A * | 6/1993 | Bradt ..................... H03G 3/348 |
| | | 455/352 |
| 2003/0202305 A1* | 10/2003 | Engel ..................... H02H 3/085 |
| | | 361/93.8 |
| 2011/0062777 A1* | 3/2011 | Sotnikow ................ H02J 9/061 |
| | | 307/9.1 |

FOREIGN PATENT DOCUMENTS

| JP | H0465042 A | 3/1992 |
| JP | 2011210687 A | 10/2011 |
| JP | 5489820 B2 | 5/2014 |

OTHER PUBLICATIONS

International Search Report (PCT/ISA/210) with English translation and Written Opinion (PCT/ISA/237) mailed on Oct. 8, 2019, by the Japan Patent Office as the International Searching Authority for International Application No. PCT/JP2019/029066.

(Continued)

*Primary Examiner* — Jared Fureman
*Assistant Examiner* — Lucy M Thomas
(74) *Attorney, Agent, or Firm* — Buchanan Ingersoll & Rooney PC

(57) ABSTRACT

A slow-release relay circuit includes: a power storage circuit connected in parallel to a relay including a coil; a discharge circuit that releases electrical charge of the power storage circuit; and a timer circuit that, when detecting interruption of supply of power to the relay, drives the discharge circuit after a prescribed time.

8 Claims, 10 Drawing Sheets

(56) References Cited

OTHER PUBLICATIONS

Notification of reasons for refusal issued in corresponding Patent Application No. JP 2021-534490, dated Nov. 2, 2021, 5 pages.
Office Action dated May 31, 2022, issued in corresponding Indian Patent Application No. 202127058227, 5 pages.

* cited by examiner

SLOW-RELEASE RELAY CIRCUIT AND TRAIN CONTROL DEVICE

FIELD

The present invention relates to a slow-release relay circuit for use in trains, railway facilities, and the like, and to a train control device.

BACKGROUND

Slow-release relay circuits have been used for devices installed on trains, and facilities such as railway signals and railway crossings. For the slow-release relay circuit, a relay operates when a direct-current voltage is applied, and continues operating for a certain period of time even after the application of the direct-current voltage stops. The relay enters a return state after the certain period of time. In order to continue operating for a certain period of time even after the application of the direct-current voltage stops, the glow-release relay circuit includes a power storage circuit that stores a direct-current voltage. In general, a power storage circuit uses a large-capacity electrolytic capacitor, and a discharge time varies due to such an influence as a variation in capacity of the electrolytic capacitor, and a decrease in capacity due to deterioration. For this reason, a time during which to continue the operation of the relay also varies, and thus it is difficult to adjust a time the relay enters the return state. To address such a problem, Patent Literature 1 discloses a technique for controlling a switching circuit provided between a relay and a power storage circuit with a charge/discharge circuit to thereby control a time in which to bring the relay from an operating state to a return state.

CITATION LIST

Patent Literature

Patent Literature 1: Japanese Patent No. 5489820

SUMMARY

Technical Problem

For the above conventional technique, the switching circuit performs interruption when the relay is in the operating state. For this reason, unfortunately, a counter electromotive voltage can be generated from the relay, and do damage to the switching circuit in a case where the relay is an inductive load.

The present invention has been made in view of the above, and an object thereof is to obtain a slow-release relay circuit capable of controlling a time in which to bring a relay from an operating state to a return state without generating a counter electromotive voltage in the relay which is an inductive load.

Solution to Problem

To solve the above problem and achieve the object, a slow-release relay circuit according to the present invention comprises: a power storage circuit connected in parallel to a relay including a coil; a discharge circuit to release electrical charge of the power storage circuit; and a timer circuit to, when detecting interruption of supply of power to the relay, drive the discharge circuit after a prescribed time.

Advantageous Effects of Invention

The present invention achieves an effect that the slow-release relay circuit can control a time in which to bring the relay from the operating state to the return state without generating the counter electromotive voltage in the relay which is the inductive load.

DESCRIPTION OF EMBODIMENTS

Hereinafter, a slow-release relay circuit and a train control device according to each embodiment of the present invention will be described in detail with reference to the drawings. The present invention is not limited to the embodiments.

First Embodiment

Figure 1:
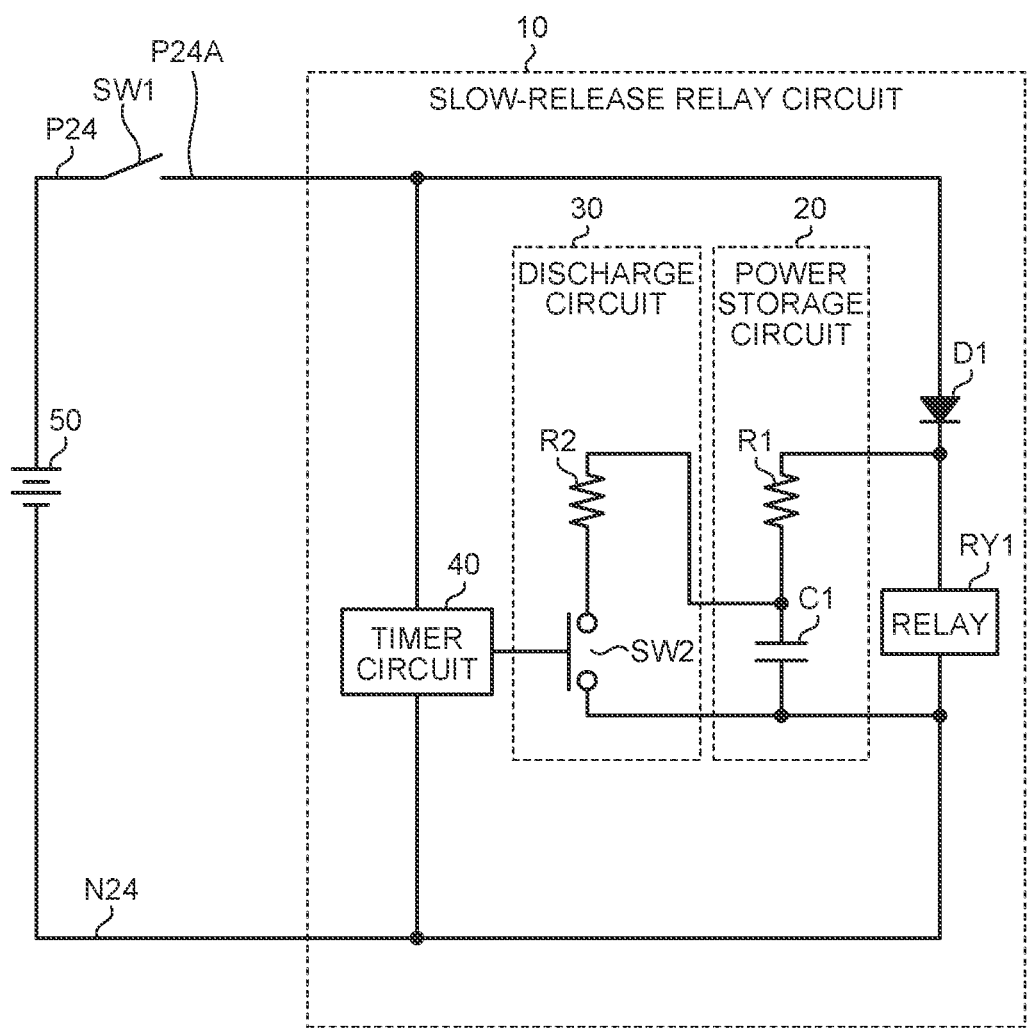
FIG. 1 is a diagram illustrating an example configuration of a slow-release relay circuit according to a first embodiment.

FIG. 1 is a diagram illustrating an example configuration of a slow-release relay circuit 10 according to a first embodiment of the present invention. A power supply line P24A and a power supply line N24 are connected to the slow-release relay circuit 10. A power supply line P24 and the power supply line N24 are connected to a direct-current power supply 50. A switch SW1 connects and disconnects the power supply line P24A and the power supply line P24. The slow-release relay circuit 10 is connected to the direct-current power supply 50 via the power supply line P24, the switch SW1, the power supply line P24A, and the power supply line N24. When the switch SW1 is operated to be closed, the power supply line P24A is energized and supply of power from the direct-current power supply 50 to the slow-release relay circuit 10, that is, application of a direct-current voltage starts. When the switch SW1 is operated to open, the power supply line P24A is de-energized, and the supply of power from the direct-current power supply 50 to the slow-release relay circuit 10 stops. The direct-current power supply 50 may be in the form of a battery as illustrated in FIG. 1, or may be an alternating-current power supply and a converter that converts an alternating-current voltage output from the alternating-current power supply into a direct-current voltage.

A configuration of the slow-release relay circuit 10 will be described. As illustrated in FIG. 1, the slow-release relay circuit 10 includes a diode D1, a relay RY1, a power storage circuit 20, a discharge circuit 30, and a timer circuit 40.

The relay RY1 includes a coil (not illustrated) therein. That is, the relay RY1 is a relay which is an inductive load. When a direct-current voltage is applied to the relay RY1 of the slow-release relay circuit 10 with normally open contact closed, the relay RY1 is in an operating state. In addition, when no direct-current voltage is applied to the relay RY1 with the normally open contact open, the relay RY1 is in a return state.

The diode D1 is a backflow prevention diode that prevents electrical charge from leaking from the relay RY1 or the power storage circuit 20 to the power supply line P24A.

In the slow-release relay circuit 10, the power storage circuit 20 is connected in parallel to the relay RY1, i.e., the coil of the relay RY1. A configuration of the power storage circuit 20 will be described. The power storage circuit 20 includes a resistor R1 and a capacitor C1. The resistor R1 limits an inrush current flowing to the capacitor C1. A resistance value of the resistor R1 is denoted by $R_1$, and resistors described later will be defined in the same manner. When a voltage is applied to the power supply line P24A, the capacitor C1 is charged with the direct-current voltage supplied from the direct-current power supply 50 within a range of a capacitance of the capacitor C1. After the power supply line P24A is de-energized, the capacitor C1 supplies the direct-current voltage to the relay RY1 and maintains the operating state of the relay RY1. When the capacitor C1 enters a discharge state, the relay RY1 enters the return state. The capacitance of the capacitor C1 denoted by $C_1$, and capacitors described later will be defined in the same manner.

Figure 2:
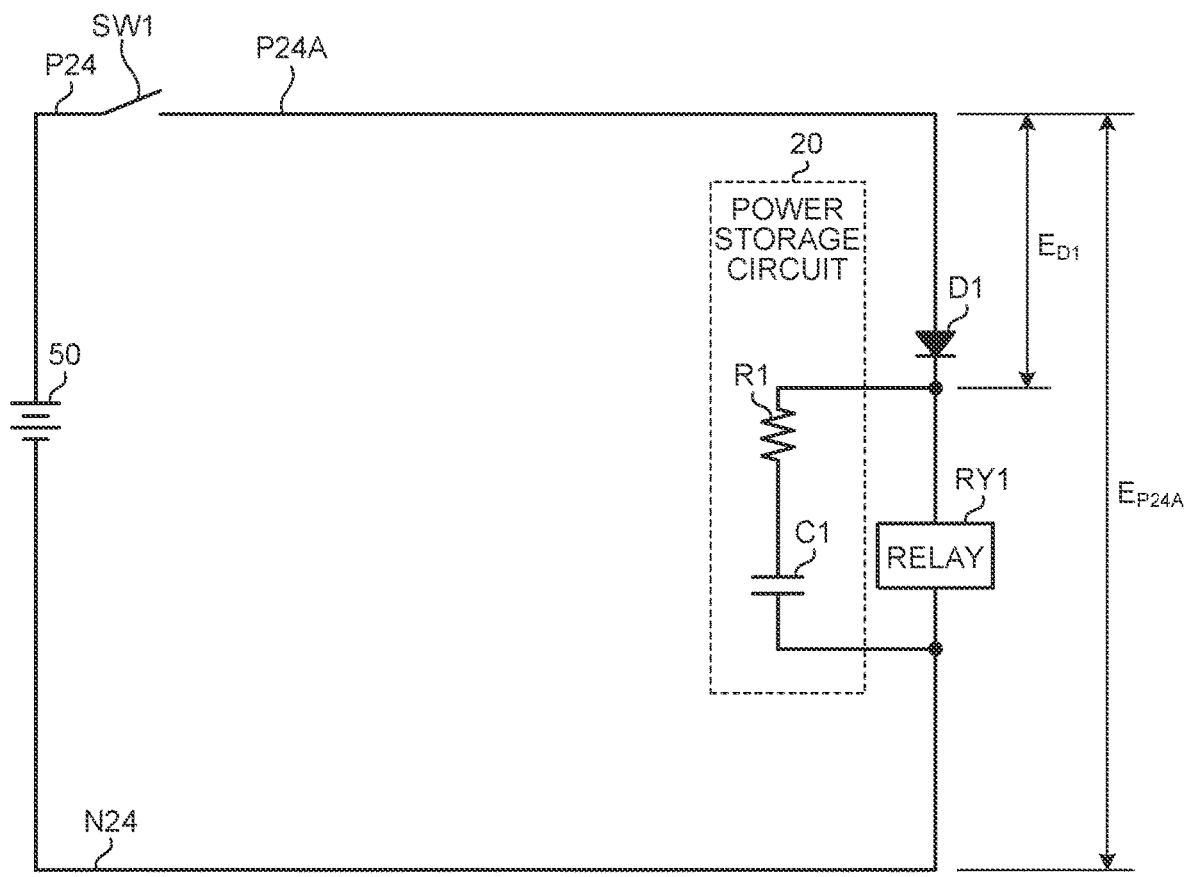
FIG. 2 is a diagram illustrating voltages applied to a diode, a relay, and a power storage circuit in the slow-release relay circuit according to the first embodiment.
Figure 3:
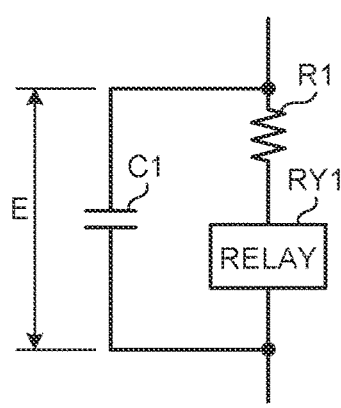
FIG. 3 is a diagram illustrating a voltage discharged from a capacitor of the power storage circuit in the slow-release relay circuit according to the first embodiment.
Figure 4:
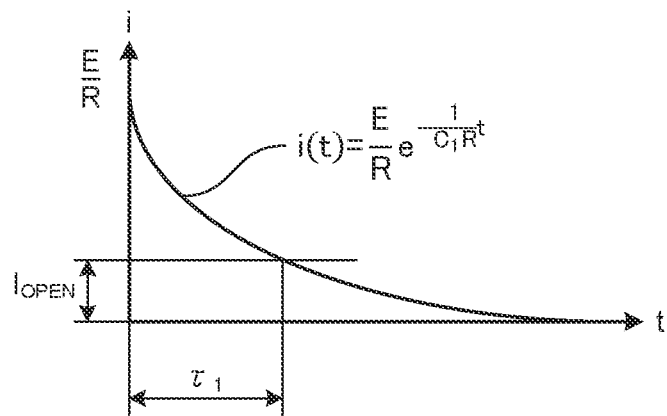
FIG. 4 is a diagram illustrating a time until the relay changes from an operating state to a return state in the slow-release relay circuit according to the first embodiment.

An operation of the power storage circuit 20 will be described with reference to FIGS. 2 to 4. FIG. 2 is a diagram illustrating voltages applied to the diode D1, the relay RY1, and the power storage circuit 20 in the slow-release relay circuit 10 according to the first embodiment. FIG. 3 is a diagram illustrating a voltage discharged from the capacitor C1 of the power storage circuit 20 in the slow-release relay circuit 10 according to the first embodiment. FIG. 4 is a diagram illustrating a time until the relay RY1 changes from the operating state to the return state in the slow-release relay circuit 10 according to the first embodiment. FIGS. 2 and 3 illustrate only portions necessary for the description, and omit portions unnecessary for the description.

When the switch SW1 is closed in FIG. 2, a voltage from the direct-current power supply 50 is applied to the power supply line P24A. Assuming that the voltage applied to the power supply line P24A is denoted by $E_{P24A}$ and a forward voltage of the diode D1 is denoted by $E_{D1}$, a voltage of $E=E_{P24A}-E_{D1}$ is applied to the relay RY1. In this case, a voltage is applied to the capacitor C1 of the power storage circuit 20 via the resistor R1. When power is stored in the capacitor C1, no current flows through the resistor R1. As a result, the voltage applied to the capacitor C1 becomes the voltage E.

An open voltage of the relay RY1 is denoted by $E_{OPEN}$. The resistance value of the relay RY1 is $R_{RY1}$. A current $I_{OPEN}$ flowing through the relay RY1 when the relay RY1 changes from the operating state to the return state can be expressed by formula (1) below.

$$I_{OPEN}=E_{OPEN}/R_{RY1} \qquad (1)$$

The operation of the relay RY1 when the switch SW1 is opened after the capacitor C1 of the power storage circuit 20 is charged with the switch SW1 closed in FIG. 2 will be described. Assume that the voltage applied to the capacitor C1 when the switch SW1 is opened is denoted by $E=E_{P24A}-E_{D1}$ and a combined resistance of the resistor R1 and the relay RY1 is denoted by $R=R_1+R_{RY1}$. A current i(t) flowing through the relay RY1 at a time t can be expressed by formula (2) below.

$$i(t)=(E/R)\exp(-t/C_1 \cdot R) \qquad (2)$$

FIG. 4 is a graph of the current i(t) expressed by formula (2). In FIG. 4, the horizontal axis represents time, and the vertical axis represents current. As illustrated in FIG. 4, the current i(t) decreases with the lapse of time, and when the current $i(t)=I_{OPEN}$ holds true, the relay RY1 enters the return state. In a case where a time until the relay RY1 enters the return state is denoted by τ1, formula (2) can be expressed by formula (3) below.

$$I_{OPEN}=(E/R)\exp(-\tau 1/C_1 \cdot R) \qquad (3)$$

A time τ1 until the relay RY1 enters the return state after the switch SW1 is opened is determined by formula (3).

Next, a configuration and an operation of the discharge circuit 30 will be described. The discharge circuit 30 discharges the power storage circuit 20. More specifically, the discharge circuit 30 releases electrical charge accumulated in the capacitor C1 of the power storage circuit 20. The discharge circuit 30 includes a resistor R2 and a switch SW2. The resistor R2 has one end connected to one end of the capacitor C1 of the power storage circuit 20, and an opposite end connected to an opposite electrode of the capacitor C1 of the power storage circuit 20 via the switch SW2. The electrical charge accumulated in the capacitor C1 of the power storage circuit 20 is released via the resistor R2 when the switch SW2 is closed.

Figure 5:
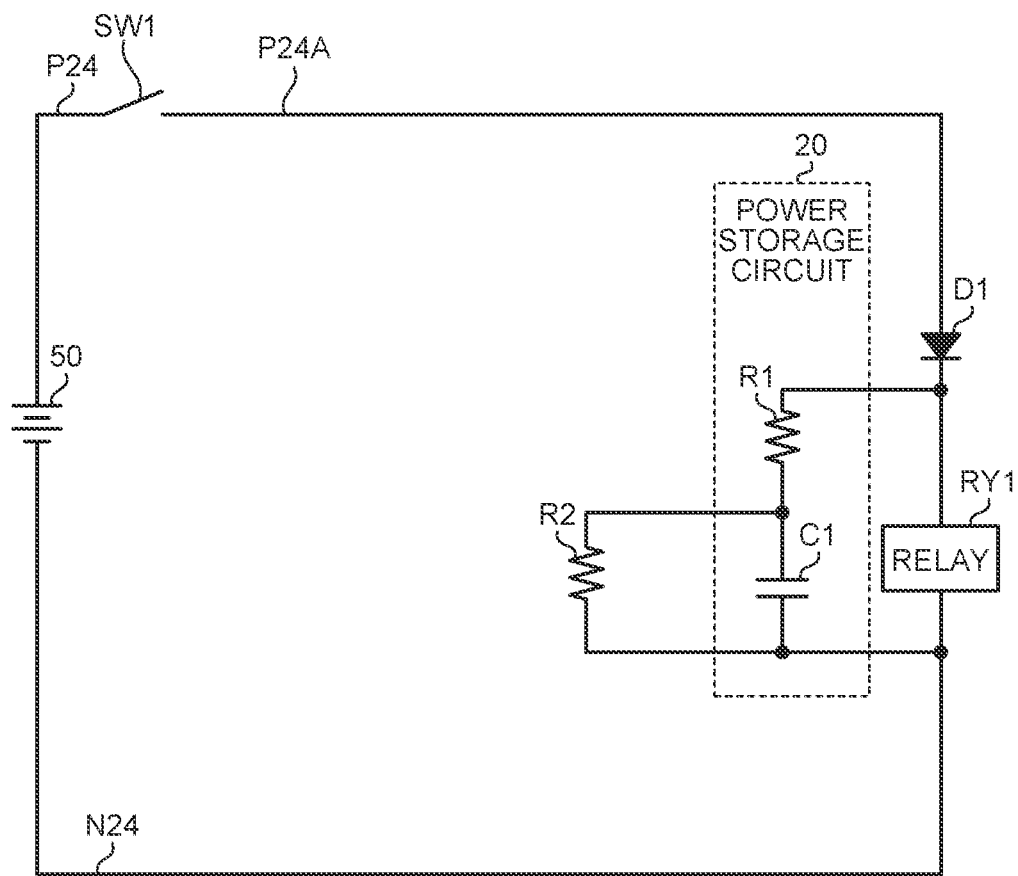
FIG. 5 is a circuit diagram illustrating a state when a switch of a discharge circuit in the slow-release relay circuit according to the first embodiment is closed.
Figure 6:
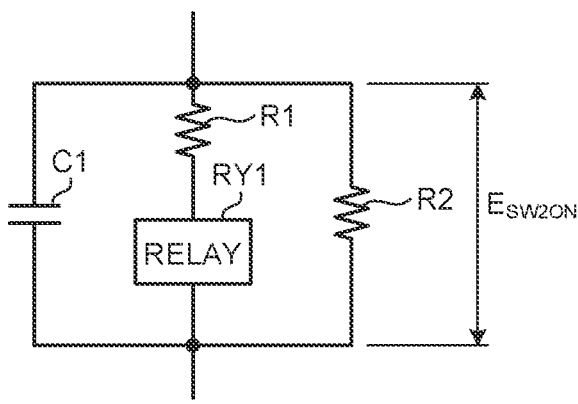
FIG. 6 is a diagram illustrating a voltage discharged from the capacitor of the power storage circuit when the switch of the discharge circuit in the slow-release relay circuit according to the first embodiment is closed.
Figure 7:
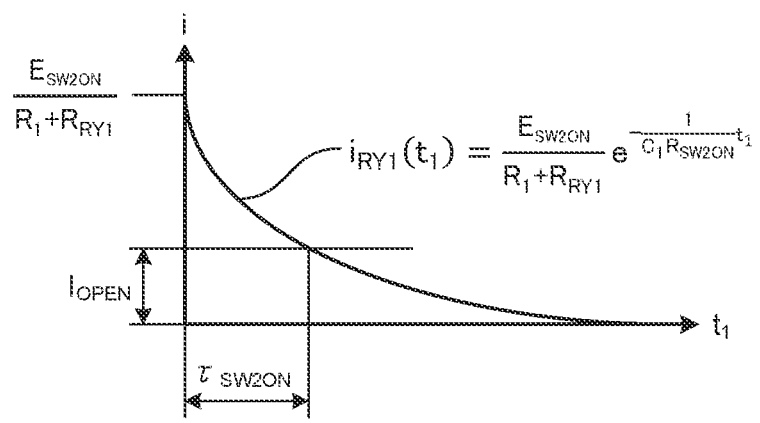
FIG. 7 is a diagram illustrating a time until the relay changes from the operating state to the return state when the switch of the discharge circuit in the slow-release relay circuit according to the first embodiment is closed.

When the switch SW2 is closed, the resistor R2 is connected in parallel to a series circuit made up of the resistor R1 and the relay RY1. FIGS. 5 to 7 each illustrate a state when the switch SW2 is closed. FIG. 5 is a circuit diagram illustrating a state when the switch SW2 of the discharge circuit 30 in the slow-release relay circuit 10 according to the first embodiment is closed. FIG. 6 is a diagram illustrating a voltage discharged from the capacitor C1 of the power storage circuit 20 when the switch SW2 of the discharge circuit 30 in the slow-release relay circuit 10 according to the first embodiment is closed. FIG. 7 is a diagram illustrating a time until the relay RY1 changes from the operating state to the return state when the switch SW2 of the discharge circuit 30 in the slow-release relay circuit 10 according to the first embodiment is closed.

Assume that a combined resistance of the resistor R2 and the series circuit of the resistor R1 and the relay RY1 is denoted by $R_{SW2ON}$. The combined resistance $R_{SW2ON}$ can be expressed by formula (4) below. Note that "//" is a symbol indicating a parallel circuit.

$$R_{SW2ON} = (R_1 + R_{RY1}) // R_2 \quad (4)$$
$$= 1/(1/R_2 + 1/(R_1 + R_{RY1}))$$

A voltage of the capacitor C1 when the switch SW2 is closed after the switch SW1 is opened in FIG. 5 is denoted by $E_{SW2ON}$. In addition, a time elapsed since the switch SW2 is closed is denoted by $t_1$. With the time t1 elapsed, a current $i_{SW2ON}(t_1)$ flowing through the combined resistance $R_{SW2ON}$ can be expressed by formula (5) below.

$$i_{SW2ON}(t_1) = (E_{SW2ON}/R_{SW2ON})\exp(-t_1/C_1 \cdot R_{SW2ON}) \quad (5)$$

With the current $i_{SW2ON}(t_1)$, a voltage $e_{SW2ON}(t_1)$ across the combined resistance $R_{SW2ON}$ can be expressed by formula (6) below.

$$e_{SW2ON}(t_1) = R_{SW2ON} \cdot i_{SW2ON}(t_1) \quad (6)$$
$$= E_{SW2ON} \cdot \exp(-t_1/C_1 \cdot R_{SW2ON})$$

Since a voltage $e_{RY1}(t_1)$ applied to the relay RY1 is a divided voltage based on the resistance $R_1$ of the resistor R1 and the resistance $R_{RY1}$ of the relay RY1, the voltage $e_{RY1}(t_1)$ can be expressed by formula (7) below.

$$e_{RY1}(t_1) = (R_{RY1}/(R_1 + R_{RY1})) \cdot e_{SW2ON}(t_1)$$
$$= (R_{RY1}/(R_1 + R_{RY1})) \cdot E_{SW2ON} \cdot \exp(-t_1/C_1 \cdot R_{SW2ON})$$

With the voltage $e_{RY1}(t_1)$, drive current $i_{RY1}(t_1)$ through the relay RY1 can be expressed by formula (8) below.

$$i_{RY1}(t_1) = e_{RY1}(t_1)/R_{RY1} \quad (8)$$
$$= (1/(R_1 + R_{RY1})) \cdot E_{SW2ON} \cdot \exp(-t_1/C_1 \cdot R_{SW2ON})$$

FIG. 7 is a graph of the drive current $i_{RY1}(t_1)$ expressed by formula (8). In FIG. 7, the horizontal axis represents time, and the vertical axis represents current. As illustrated in FIG. 7, when the drive current $i_{RY1}(t_1)$ through the relay RY1 becomes the relay FY1 enters the return state. When the relay FY1 enters the return state after the lapse of a time $\tau_{SW2ON}$ since the closing of the switch SW2, formula (9) below holds true.

$$I_{OPEN} = (1/(R_1+R_{RY1})) \cdot E_{SW2ON} \exp(-\tau_{SW2ON}/C_1 \cdot R_{SW2ON}) \quad (9)$$

Note that $R_{SW2ON} = (R_1+R_{RY1})) \cdot R_2 < R_1+R_{RY1}$ holds true. An absolute value of a slope of the drive current $i_{RY1}(t_1)$ is larger than an absolute value of a slope of the current i(t). That is, closing the switch SW2 allows the relay RY1 to enter the return state earlier than when the relay RY1 enters the return state without the switch SW2 being closed. A designer of the slow-release relay circuit 10, for example, reduces a resistance value of the resistor R2 to thereby set a sufficiently small time $\tau_{SW2ON}$.

An operation of the timer circuit 40 will be described. When detecting the interruption of supply of power to the coil of the relay RY1, the timer circuit 40 drives the discharge circuit 30 after a prescribed time. More specifically, the timer circuit 40 sets the switch SW2 of the discharge circuit 30 to an open state when the power supply line P24A is energized. When the power supply line P24A changes from the energized state to the de-energized state, the timer circuit 40 sets the switch SW2 of the discharge circuit 30 to a closed state after the lapse of a prescribed time since the power supply line P24A becomes de-energized. The prescribed time in the timer circuit 40 is referred to as a time constant of the timer circuit 40. The time constant of the timer circuit 40 is denoted by τ2. The designer of the slow-release relay circuit 10, for example, sets the time constant τ2 of the timer circuit 40 such that the time constant τ2 has the relationship with the time τ1: τ2<τ1 where the time τ1 is determined by the configurations of the power storage circuit 20 and the relay RY1.

The capacitor C1 of the power storage circuit 20 needs to have a large capacity in order to maintain the operating state of the relay RY1. For this reason, the capacitor C1 is an electrolytic capacitor. The electrolytic capacitor, i.e., the capacitor C1 varies in capacitance, and changes depending upon temperature and with the lapse of time, for example. In addition, the resistance $R_{RY1}$ of the relay RY1 has its resistance value that initially varies and changes depending upon temperature, for example. For this reason, unfortunately, the time τ1 cannot be accurately designed.

In the present embodiment, the timer circuit 40 is made up of a circuit not easily affected by an electrolytic capacitor, a relay, and the like. The thus configured timer circuit 40 can bring the relay RY1 to the return state in the time constant 12 of the timer circuit 40 after the switch SW1 is opened and the power supply line P24A becomes de-energized.

As described above, according co the present embodiment, the slow-release relay circuit 10 includes the power storage circuit 20, the discharge circuit 30, and the timer circuit 40. The timer circuit 40 discharges the power storage circuit 20 through the discharge circuit 30 in the time constant τ2 having the relationship with the time τ1: τ2<τ1 where τ1 is determined by the configurations of the power storage circuit 20 and the relay RY1. Consequently, the slow-release relay circuit 10 can control the time for bringing the relay RY1 from the operating state to the return state, without generating a counter electromotive voltage in the relay RY1 which is an inductive load. Since the slow-release relay circuit 10 releases the electrical charge of the power storage circuit 20, an electrical path is not disconnected in principle in the coil of the relay RY1, and a counter electromotive voltage is not generated.

Second Embodiment

In a second embodiment, specifically, a case where the timer circuit 40 is configured with an electrical circuit will be described.

Figure 8:
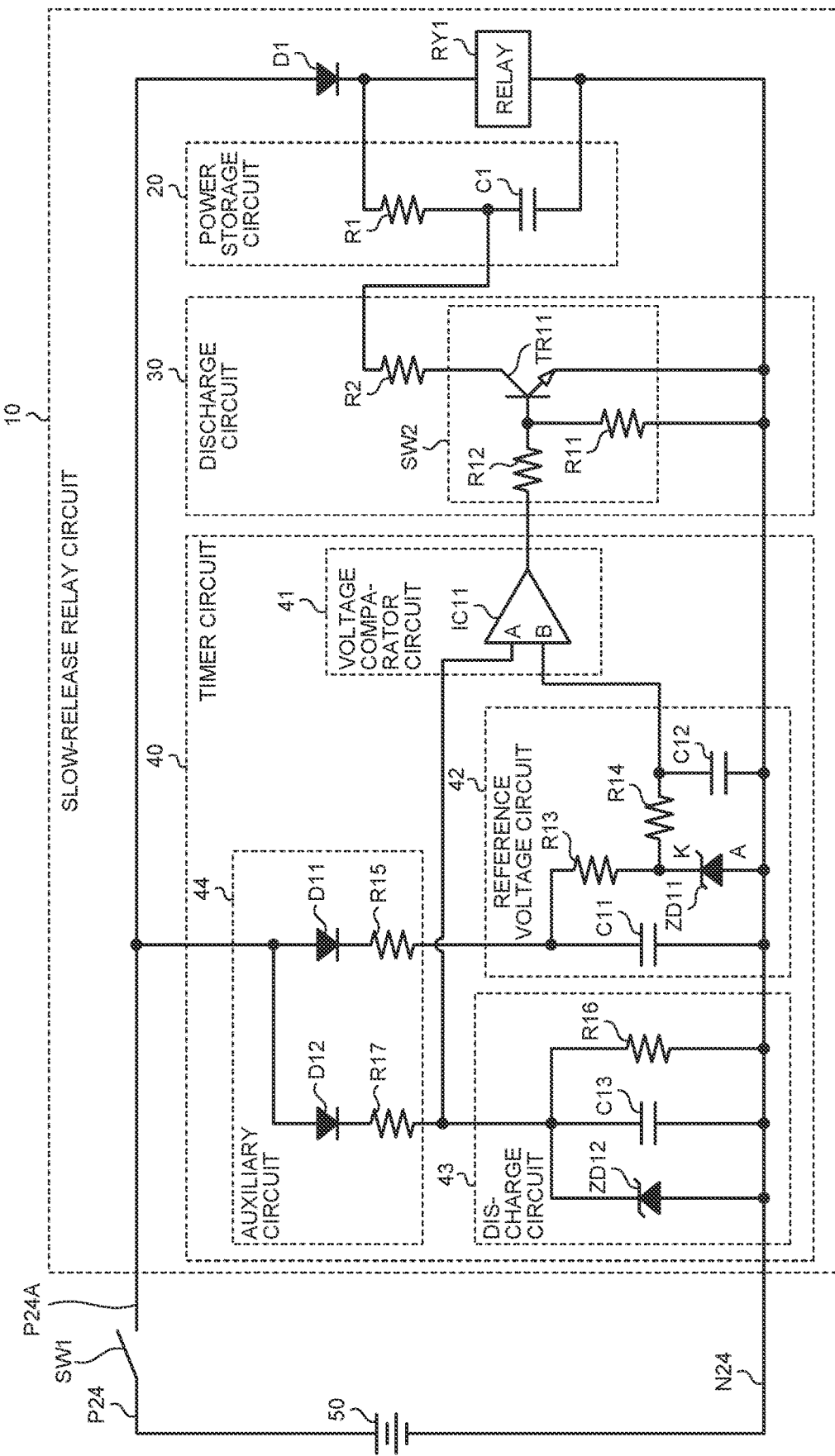
FIG. 8 is a diagram illustrating an example configuration of the slow-release relay circuit according to a second embodiment.

FIG. 8 is a diagram illustrating an example configuration of the slow-release relay circuit 10 according to the second embodiment. The resistor R2 of the discharge circuit 30 illustrated in FIG. 8 is similar to the resistor R2 of the discharge circuit 30 in the first embodiment illustrated in FIG. 1. In the discharge circuit 30, the switch SW2 includes a transistor TR11, a resistor R11, and a resistor R12. The resistor R11 is a resistor for preventing a base of the transistor TR11 from becoming high impedance. The resistor R12 is a resistor for limiting a base current of the transistor TR11. When a base voltage becomes larger than a prescribed value, the transistor TR11 is turned on, such that the transistor TR11 becomes conductive between a collector and an emitter thereof. When the base voltage becomes smaller than the prescribed value, the transistor TR11 is turned off, such that a current does not flow between the collector and the emitter of the transistor TR11. In the second embodiment, the discharge circuit 30 may be referred to as a first discharge circuit.

The timer circuit 40 includes a voltage comparator circuit 41, a reference voltage circuit 42, a discharge circuit 43, and an auxiliary circuit 44.

A configuration and an operation of the voltage comparator circuit 41 will be described. The voltage comparator circuit 41, which includes a voltage comparator IC11, compares an output voltage of the reference voltage circuit 42 with an output voltage of the discharge circuit 43. When the output voltage of the discharge circuit 43 is larger than the output voltage of the reference voltage circuit 42, the voltage comparator circuit 41 outputs, to the transistor TR11 of the discharge circuit 30, a voltage at which the transistor TR11 is turned off. When the output voltage of the discharge circuit 43 is smaller than the output voltage of the reference voltage circuit 42, the voltage comparator circuit 41 outputs, to the transistor TR11 of the discharge circuit 30, a voltage at which the transistor TR11 is turned on.

For the slow-release relay circuit 10, thus, when the output voltage of the discharge circuit 43 is larger than the output voltage of the reference voltage circuit 42, electrical charge is accumulated in the capacitor C1 of the power storage circuit 20, and the relay RY1 enters the operating state. For the slow-release relay circuit 10, also, when the output voltage of the discharge circuit 43 is smaller than the output voltage of the reference voltage circuit 42, the electrical charge of the capacitor C1 of the power storage circuit 20 is released, and the relay RY1 enters the return state.

A configuration and an operation of the reference voltage circuit 42 will be described. The reference voltage circuit 42 includes a capacitor C11, a resistor R13, a Zener diode ZD11, a resistor R14, and a capacitor C12. The reference voltage circuit 42 is connected to the power supply line P24A via a diode D11 and a resistor R15 of the auxiliary circuit 44. The diode D11 is a backflow prevention diode that prevents electrical charge of the capacitor C11 of the reference voltage circuit 42 from leaking to other circuits when the switch SW1 is opened. The resistor R15 is a resistor for limiting a current to the capacitor C11 when the state of the switch SW1 changes from an open state to a closed state. When the switch SW1 is closed, the reference voltage circuit 42 allows electrical charge to be accumulated via the diode D11 and the resistor R15 in the capacitor C11 which is a first capacitor.

When the switch SW1 is closed, furthermore, the reference voltage circuit 42 allows a voltage to applied to the Zener diode ZD11 via the resistor R13 which is a first resistor. When a voltage higher than a Zener voltage is applied to a cathode of the Zener diode ZD11 which is a first constant-voltage diode, the Zener diode ZD11 is at a constant voltage. The constant voltage obtained at the Zener diode ZD11 is defined as a first constant voltage. In the reference voltage circuit 42, the capacitor C11 is connected in parallel to a circuit including the Zener diode ZD11 and the resistor R13 connected in series with each other. The reference voltage circuit 42 outputs, as a reference voltage, a voltage that has become constant at the Zener diode ZD11. That is, the reference voltage circuit 42 outputs the voltage obtained by the Zener diode ZD11. The resistor R14 and the capacitor C12 are low-pass filters, and reduce noise of the reference voltage.

An operation of the reference voltage circuit 42 when the state of the switch SW1 changes from a closed state to an open state will be described. Assume that electrical charge has been accumulated in the capacitor C11 during the period with the switch SW1 closed. When the switch SW1 is opened, voltage is no longer applied to the power supply line P24A. A voltage is therefore applied to the Zener diode ZD11 from the capacitor C11 via the resistor R13. As a result, the reference voltage circuit 42 can output the reference voltage even after the switch SW1 is opened. Since an output period of the reference voltage after the switch SW1 is opened depends on a current flowing through the resistor R13 and the Zener diode ZD11, the output period is determined by the voltage of the capacitor C11 and the resistance values of the resistor R13 and the Zener diode ZD11. The output period of the reference voltage after the switch SW1 is opened is denoted by τ3.

A configuration and an operation of the discharge circuit 43 will be described. The discharge circuit 43 includes a Zener diode ZD12, a capacitor C13, and a resistor R16. The discharge circuit 43 is connected to the power supply line P24A via a diode D12 and a resistor R17 of the auxiliary circuit 44. The diode D12 is a backflow prevention diode that prevents electrical charge of the capacitor C13 of the discharge circuit 43 from leaking to other circuits when the switch SW1 is opened. The resistor R16 is a resistor for limiting a current to the capacitor C13 when the state of the switch SW1 changes from an open state to a closed state. For the discharge circuit 43, when the switch SW1 is closed, electrical charge is accumulated via the diode D12 and the resistor R17 in the capacitor C13 which is a second capacitor. For the discharge circuit 43, the Zener diode ZD12, which is a second constant-voltage diode, and the capacitor C13 are connected in parallel to each other. For this reason, a charging voltage across the capacitor C13 is limited to a Zener voltage of the Zener diode ZD12. A constant voltage obtained at the Zener diode ZD12 is defined as a second constant voltage. The discharge circuit 43 outputs a voltage that has become constant at the Zener diode ZD12. That is, the discharge circuit 43 outputs the voltage obtained by the Zener diode ZD12.

An operation of the discharge circuit 43 when the state of the switch SW1 changes from closed to open will be described. Assume that electrical charge has been accumulated in the capacitor C13 during the period with the switch SW1 closed. When the switch SW1 is opened, the capacitor C13 and the resistor R16 start discharging. A voltage of the capacitor C13 at the start of the discharge is the Zener voltage of the Zener diode ZD12. The Zener voltage of the Zener diode ZD12 is denoted by $V_{ZD12}$. When the switch SW1 is opened, a voltage E(t) of the discharge circuit 43 at the time t is expressed by formula (10) below.

$$E(t) = V_{ZD12} \cdot \exp(-t/C_{12} \cdot R_{16}) \tag{10}$$

A value of the reference voltage output from the reference voltage circuit 42 is denoted by $V_{ZD11}$. A time when $E(t)=V_{ZD11}$ holds true is denoted by τ4. The designer of the slow-release relay circuit 10, for example, designs the times τ1, τ3, and τ4 so that "τ1>τ3>τ4" holds true, thereby enabling the slow-release relay circuit 10 of the second embodiment to bring the relay RY1 to the return state in the time τ4 after the switch SW1 is opened.

Figure 9:
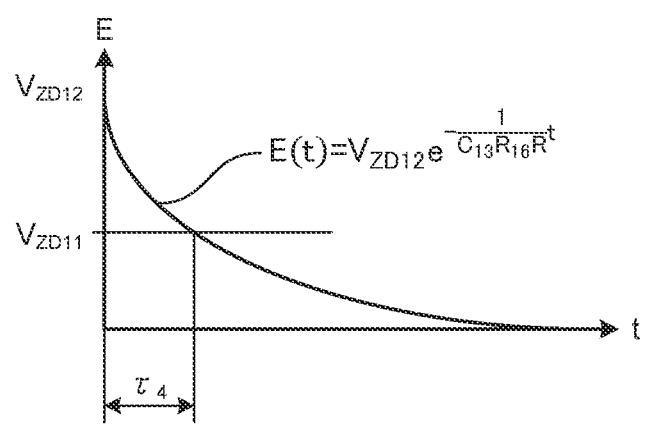
FIG. 9 is a diagram illustrating voltages output from a reference voltage circuit and a discharge circuit of a timer circuit in the slow-release relay circuit according to the second embodiment.

FIG. 9 is a diagram illustrating voltages output from the reference voltage circuit 42 and the discharge circuit 43 of the timer circuit 40 in the slow-release relay circuit 10 according to the second embodiment. In FIG. 9, the horizontal axis represents time and the vertical axis represents voltage. In FIG. 9, $V_{ZD11}$, which is the voltage output from the reference voltage circuit 42, is constant, but in practice, the voltage decreases after the lapse of the time τ3.

The discharge circuit 43 can reduce the capacitance of the capacitor C13 by increasing the resistance of the resistor R16. For this reason, the capacitor C13 can be easily designed with a capacitor such as a film capacitor or a ceramic capacitor having its value that initially less varies and less changes depending upon temperature. Similarly, the resistor R16 can be achieved selecting a resistor having its value initially less varying and less chancing depending upon temperature. The discharge circuit 43 may be referred to as a second discharge circuit.

For the slow-release relay circuit 10, as discussed above, the voltage comparator circuit 41 compares the voltage output from the reference voltage circuit 42 with the voltage output from the discharge circuit 43. When the supply of power to the relay RY1 is interrupted and the voltage output from the discharge circuit 43 becomes equal to or lower than the voltage output from the reference voltage circuit 42, the discharge circuit 30 is driven. Note that a power supply that operates the voltage comparator circuit 41 is a circuit corresponding to the capacitor C11 of the reference voltage circuit 42. Alternatively, the capacitor C11 of the reference voltage circuit 42 may be used as the power supply that operates the voltage comparator circuit 41. The capacitor C11 of the reference voltage circuit 42 can also be shared with as the capacitor C1 of the power storage circuit 20.

As described above, the timer circuit 40 of the slow-release relay circuit 10 according to the present embodiment is defined by the electrical circuit including electrical components such as a capacitor, a resistor, and a diode. The thus defined timer circuit 40 controls a time for driving the discharge circuit 30, using a time of discharge by the capacitor and the resistor. Consequently, the slow-release relay circuit 10 can obtain the effect described in the first embodiment.

Third Embodiment

A third embodiment will be described giving an example in which the timer circuit 40 is defined by a microcomputer or the like.

Figure 10:
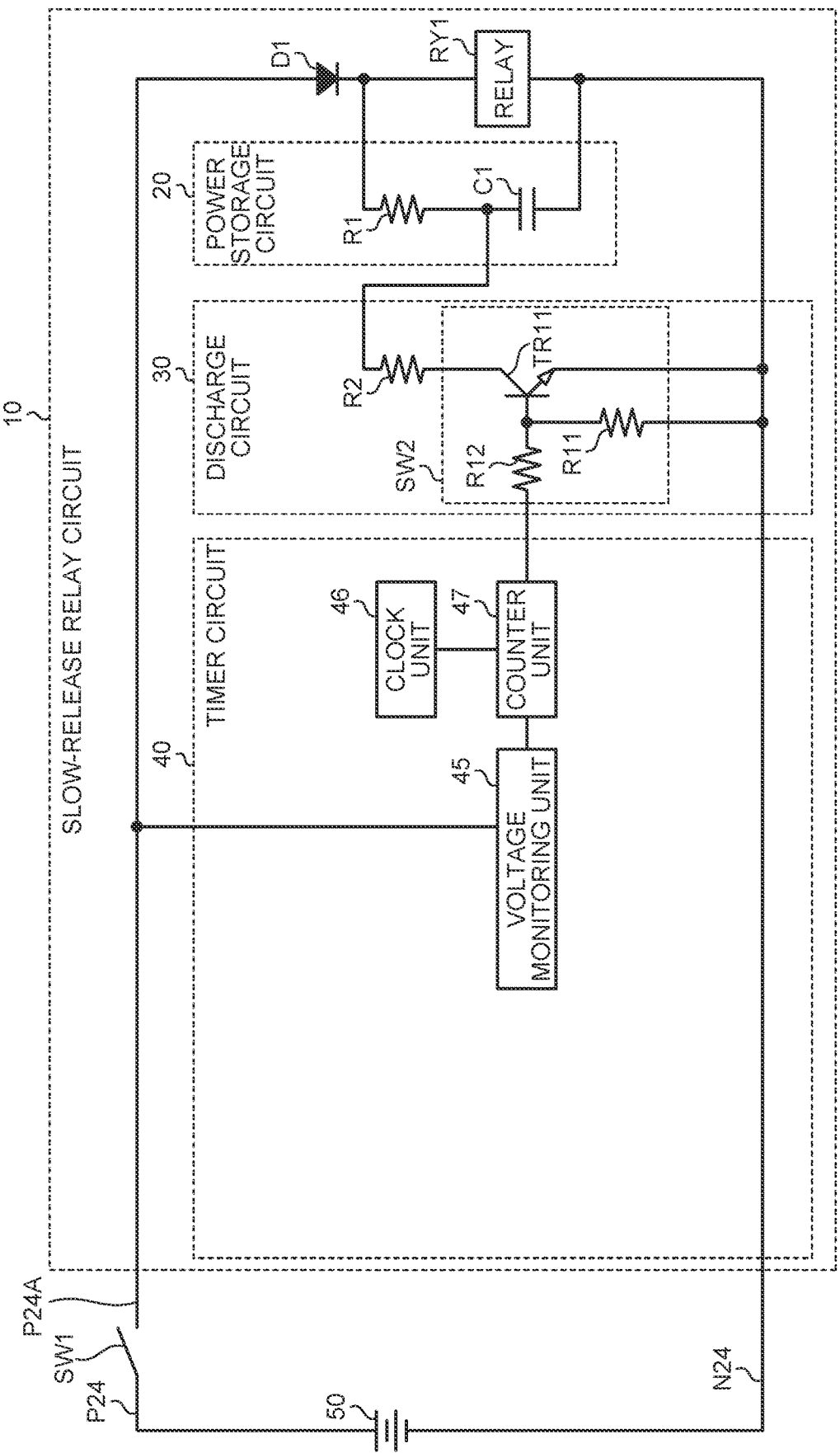
FIG. 10 is a diagram illustrating an example configuration of the slow-release relay circuit according to a third embodiment.

FIG. 10 is a diagram illustrating an example configuration of the slow-release relay circuit 10 according to the third embodiment. A configuration of the discharge circuit 30 in FIG. 10 is similar to the configuration thereof in the second embodiment illustrated in FIG. 8. The timer circuit 40 includes a voltage monitoring unit 45, a clock unit 46, and a counter unit 47.

The voltage monitoring unit 45 detects interruption of supply of power to the relay RY1. More specifically, the voltage monitoring unit 45 monitors the voltage of the power supply line P24A and determines whether the power supply line P24A is in an energized state or a de-energized state. The voltage monitoring unit 45 causes the counter unit 47 to start counting when the power supply line P24A changes from the energized state to the de-energized state.

The clock unit 46 generates a clock which is a period in which the counter unit 47 counts.

The counter unit 47 starts counting after the voltage monitoring unit 45 detects the interruption of the supply of power to the relay RY1. When the slow-release relay circuit 10 is powered on, the counter unit 47 outputs a voltage at which to turn off the transistor TR11 of the discharge circuit 30. When having counted a prescribed number, the counter unit 47 outputs a voltage at which to turn on the transistor TR11 of the discharge circuit 30, that is, drives the discharge circuit 30.

The time τ1 until the power storage circuit 20 brings the relay RY1 to the return state is set to be longer than operation periods of the timer circuit 40 and the discharge circuit 30. That is, the operation periods of the timer circuit 40 and the discharge circuit 30 are set to be shorter than the time τ1 until the power storage circuit 20 to bring the relay RY1 to the return state. The slow-release relay circuit 10 brings the relay RY1 to the return state in a time determined by the clock unit 46 and the counter unit 47. It is easy to determine such a component that provides a high degree of accuracy regarding initial value variations and temperature characteristics of the clock unit 46 as compared with the time τ1 determined by the capacitor C1. For example, a crystal transmitter is used as the clock unit 46.

Figure 11:
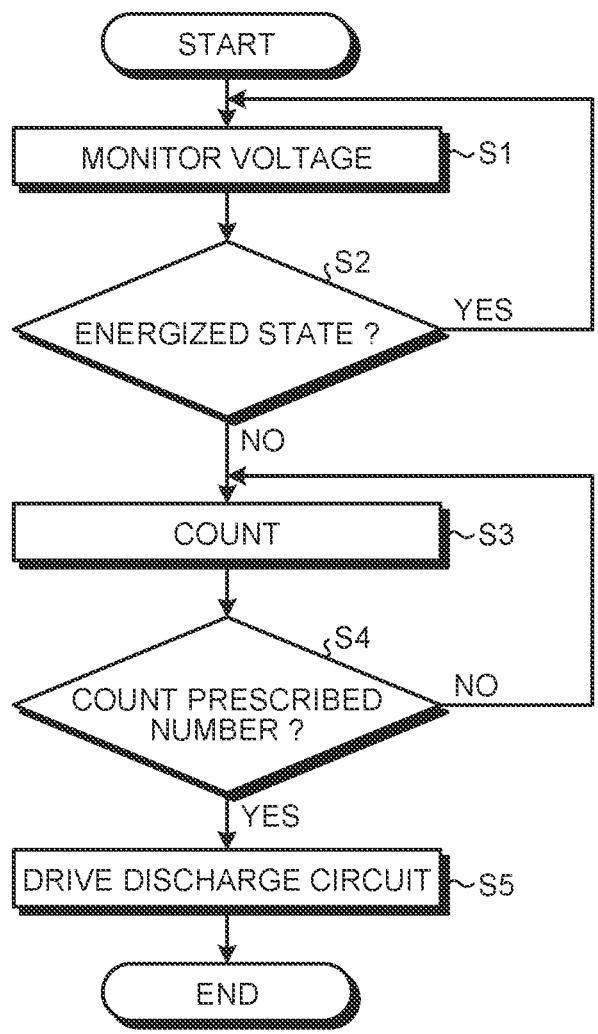
FIG. 11 is a flowchart illustrating an operation of the timer circuit of the slow-release relay circuit according to the third embodiment.

FIG. 11 is a flowchart illustrating an operation of the timer circuit 40 of the slow-release relay circuit 10 according to the third embodiment. In the timer circuit 40, the voltage monitoring unit 45 monitors the voltage of the power supply line P24A (step S1). If the power supply line P24A is in the energized state (step S2: Yes), the voltage monitoring unit 45 returns to step S1 and continues the monitoring. If the power supply line P24A is in the de-energized state (step S2: No), the voltage monitoring unit 45 instructs the counter unit 47 to start counting. The counter unit 47 performs counting at a timing of the clock generated by the clock unit 46 (step S3). If the counter unit 47 does not count the prescribed number (step S4: No), the counter unit 47 returns to step S3 and continues the counting. If the counter unit 47 has counted the prescribed number (step S4: Yes), the counter unit 47 drives the discharge circuit 30 (step S5). In the above-described example, the counter unit 47 outputs a voltage at which to turn on the transistor TR11 of the discharge circuit 30. Consequently, the discharge circuit 30 starts discharging the power storage circuit 20.

Next, a hardware configuration of the timer circuit 40 will be described. The timer circuit 40 is implemented by processing circuitry. The processing circuitry may be a processor that executes a program stored in a memory and the memory, or may be dedicated hardware.

Figure 12:
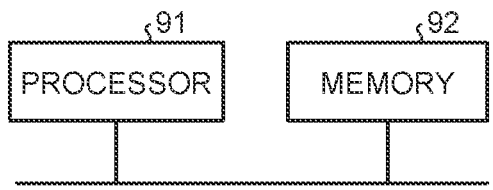
FIG. 12 is a diagram illustrating an example of a case where a processing circuitry included in the timer circuit of the slow-release relay circuit according to the third embodiment is configured with a processor and a memory.

FIG. 12 is a diagram illustrating an example of a case where a processing circuitry included in the timer circuit 40 of the slow-release relay circuit 10 according to the third embodiment is configured with a processor and a memory. In a case where the processing circuitry is configured with a processor 91 and a memory 92, functions of the processing circuitry of the timer circuit 40 are implemented by software, firmware, or a combination of software and firmware. The software or the firmware is described as a program and stored in the memory 92. In the processing circuitry, the processor 91 reads and executes the program stored in the memory 92, thereby implementing the functions. That is, the processing circuitry includes the memory 92 for storing programs that results in the timer circuit 40 executing processing. In other words, these programs cause a computer to execute procedures and methods of the timer circuit 40.

The processor 91 may be a central processing unit (CPU), a processing device, an arithmetic device, a microprocessor, a microcomputer, a digital signal processor (DSP), or the like. The memory 92 corresponds to, for example, a non-volatile or volatile semiconductor memory such as a random access memory (RAM), a read only memory (ROM), a flash memory, an erasable programmable ROM (EPROM), or an electrically EPROM (EEPROM (registered trademark)), a magnetic disk, a flexible disk, an optical disk, a compact disc, a mini disk, or a digital versatile disc (DVD).

Figure 13:
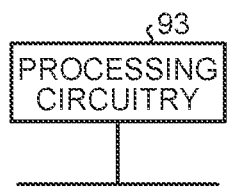
FIG. 13 is a diagram illustrating an example of a case where the processing circuitry included in the timer circuit of the slow-release relay circuit according to the third embodiment is configured with dedicated hardware.

FIG. 13 is a diagram illustrating an example of a case where the processing circuitry included in the timer circuit 40 of the slow-release relay circuit 10 according to the third embodiment is configured with dedicated hardware. In the case where the processing circuitry is configured with dedicated hardware, processing circuitry 93 illustrated in FIG. 13 corresponds to, for example, a single circuit, a composite circuit, a programmed processor, a parallel programmed processor, an application specific integrated circuit (ASIC), a field programmable gate array (FPGA), or a combination thereof. Functions of the timer circuit 40 may be separately implemented by the processing circuitry 93, or the functions may be collectively implemented by the processing circuitry 93.

A part of the functions of the timer circuit 40 may be implemented by dedicated hardware and another part thereof may be implemented by software or firmware. Thus, the processing circuitry can realize each of the above-described functions by dedicated hardware, software, firmware, or a combination thereof.

As described above, according to the present embodiment, in the slow-release relay circuit 10, the timer circuit 40 is configured with a microcomputer or the like including the clock unit 46, and controls a time for driving the discharge circuit 30. Consequently, the slow-release relay circuit 10 can obtain the effect described in the first embodiment.

Fourth Embodiment

A fourth embodiment will be described giving an example in which a discharge circuit of a slow-release relay circuit includes a fuse.

Figure 14:
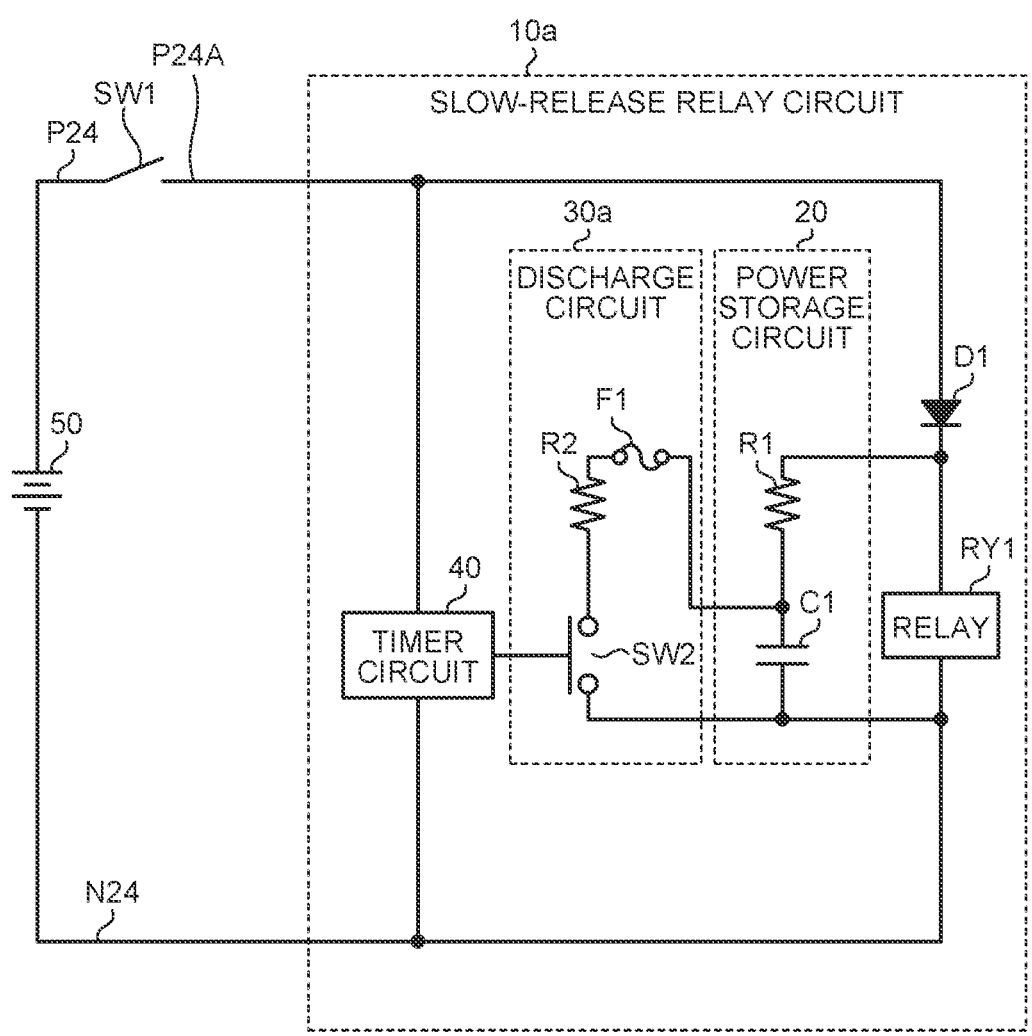
FIG. 14 is a diagram illustrating an example configuration of a slow-release relay circuit according to a fourth embodiment.

FIG. 14 is a diagram illustrating an example configuration of a slow-release relay circuit 10a according to the fourth embodiment. The slow-release relay circuit 10a includes a discharge circuit 30a replacing the discharge circuit 30 of the slow-release relay circuit 10 according to the first embodiment illustrated in FIG. 1. The discharge circuit 30a is the discharge circuit 30 with a fuse F1 added thereto. A normal operation of the slow-release relay circuit 10a is similar to the operation of the slow-release relay circuit 10 according to the first embodiment.

Assume that a failure occurs that secures the switch SW2 of the discharge circuit 30 of the slow-release relay circuit 10 of the first embodiment to a closed position. In that case, a short circuit is formed across the capacitor C1 of the power storage circuit 20. As a result, when the switch SW1 is closed, the slow-release relay circuit 10 allows a current to continue flowing through a path from the power supply line P24A toward the diode D1 and the resistor R1.

In the fourth embodiment, the discharge circuit 30a includes the fuse F1. The fuse F1 is blown when the current continues flowing through the above path for a prescribed time or longer, such that the current can be interrupted. The slow-release relay circuit 10a can interrupt the current as the fuse F1 is blown when the current continues flowing with the switch SW2 of the discharge circuit 30a secured to the closed position due to the failure. As a result, the slow-release relay circuit 10a can prevent a secondary failure caused by the continuous flowing of the current as the switch SW2 of the discharge circuit 30a is secured to the closed position due to the failure. When the switch SW2 of the discharge circuit 30a is secured to the closed position due to the failure, in addition, the slow-release relay circuit 10a operates the switch SW1 to bring the relay RY1 from the operating state to the return state.

For the slow-release relay circuit 10a according to the present embodiment, as discussed above, the discharge circuit 30a includes the fuse F1, and interrupts an internal circuit when an overcurrent flows for a prescribed time or longer. Consequently, the slow-release relay circuit 10a can prevent a secondary failure due to continuous flowing of the current.

Fifth Embodiment

A fifth embodiment will be described giving an example application of the slow-release relay circuit 10. The slow-release relay circuit 10 may be any of the slow-release relay circuits 10 of the first to third embodiments, and the slow-release relay circuit 10a of the fourth embodiment is also applicable.

Figure 15:
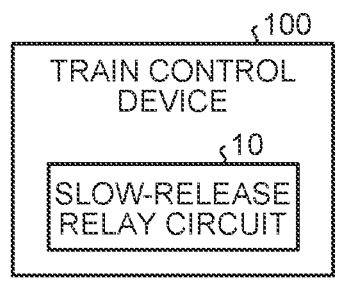
FIG. 15 is a diagram illustrating an example configuration of a train control device according to a fifth embodiment.

As described in "Background" section, the slow-release relay circuit 10 is used for devices to be installed on trains, and facilities such as railway signals and railway crossings. The devices to be installed on trains are, for example, train control devices. FIG. 15 is a diagram illustrating an example configuration of a train control device 100 according to the fifth embodiment. The train control device 100 includes the slow-release relay circuit 10. The train control device 100 operates the slow-release relay circuit 10 with a digital out signal, for example. In a case where a power supply is interrupted, the train control device 100 can operate the relay RY1 of the slow-release relay circuit 10 after the lapse of a time prescribed by the slow-release relay circuit 10.

The configurations described in each embodiment above are merely examples of the content of the present invention and can be combined with other known technology and part thereof can be omitted or modified without departing from the gist of the present invention.

REFERENCE SIGNS LIST

10, 10a slow-release relay circuit; 20 power storage circuit; 30, 30a, 43 discharge circuit; 40 timer circuit; 41 voltage comparator circuit; 42 reference voltage circuit; 44 auxiliary circuit; 45 voltage monitoring unit; 46 clock unit; 47 counter unit; 50 direct-current power supply; 100 train control device; C1, C11, C12, C13 capacitor; D1, D11, D12 diode; F1 fuse; IC11 voltage comparator; N24, P24, P24A power supply line; R1, R2, R11, R12, R13, R14, R15, R16, R17 resistor; RY1 relay; SW1, SW2 switch; TR11 transistor; ZD11, ZD12 Zener diode.

The invention claimed is:

1. A slow-release relay circuit comprising:
   a power storage circuit connected in parallel to a relay including a coil;
   a discharge circuit to release electrical charge of the power storage circuit; and a timer circuit to, when detecting interruption of supply of power to the relay, drive the discharge circuit after a prescribed time, wherein the discharge circuit is a first discharge circuit, and
the timer circuit includes:
- a reference voltage circuit including: a first capacitor; and a circuit connected in parallel to the first capacitor and including a first constant-voltage diode and a first resistor connected in series with the first constant-voltage diode, the first constant-voltage diode obtaining a first constant voltage, the reference voltage circuit outputting a voltage obtained at the first constant-voltage diode; and
- a second discharge circuit including: a second capacitor; and a second constant-voltage diode connected in parallel to the second capacitor, the second constant-voltage diode obtaining a second constant voltage higher than the first constant voltage, the second discharge circuit outputting a voltage obtained at the second constant-voltage diode, and
- the timer circuit compares a voltage output from the reference voltage circuit with a voltage output from the second discharge circuit, and drives the discharge circuit when supply of power to the relay is interrupted and the voltage output from the second discharge circuit becomes equal to or lower than the voltage output from the reference voltage circuit.

2. The slow-release relay circuit according to claim 1, wherein
the timer circuit includes processing circuitry to:
detect interruption of supply of power to the relay;
start counting after detecting the interruption of the supply of power to the relay; and
generate a clock that is a period during which the counting occurs, and
the processing circuitry drives the discharge circuit upon counting a prescribed number.

3. The slow-release relay circuit according to claim 2, wherein
the discharge circuit interrupts an internal circuit when an overcurrent flows for a prescribed time or longer.

4. A train control device comprising the slow-release relay circuit according to claim 3.

5. A train control device comprising the slow-release relay circuit according to claim 2.

6. The slow-release relay circuit according to claim 1, wherein
the discharge circuit interrupts an internal circuit when an overcurrent flows for a prescribed time or longer.

7. A train control device comprising the slow-release relay circuit according to claim 6.

8. A train control device comprising the slow-release relay circuit according to claim 1.

* * * * *